May 17, 1927.
P. CAPRI
SWAB OR DAUBER
Filed Sept. 24, 1926
1,629,436
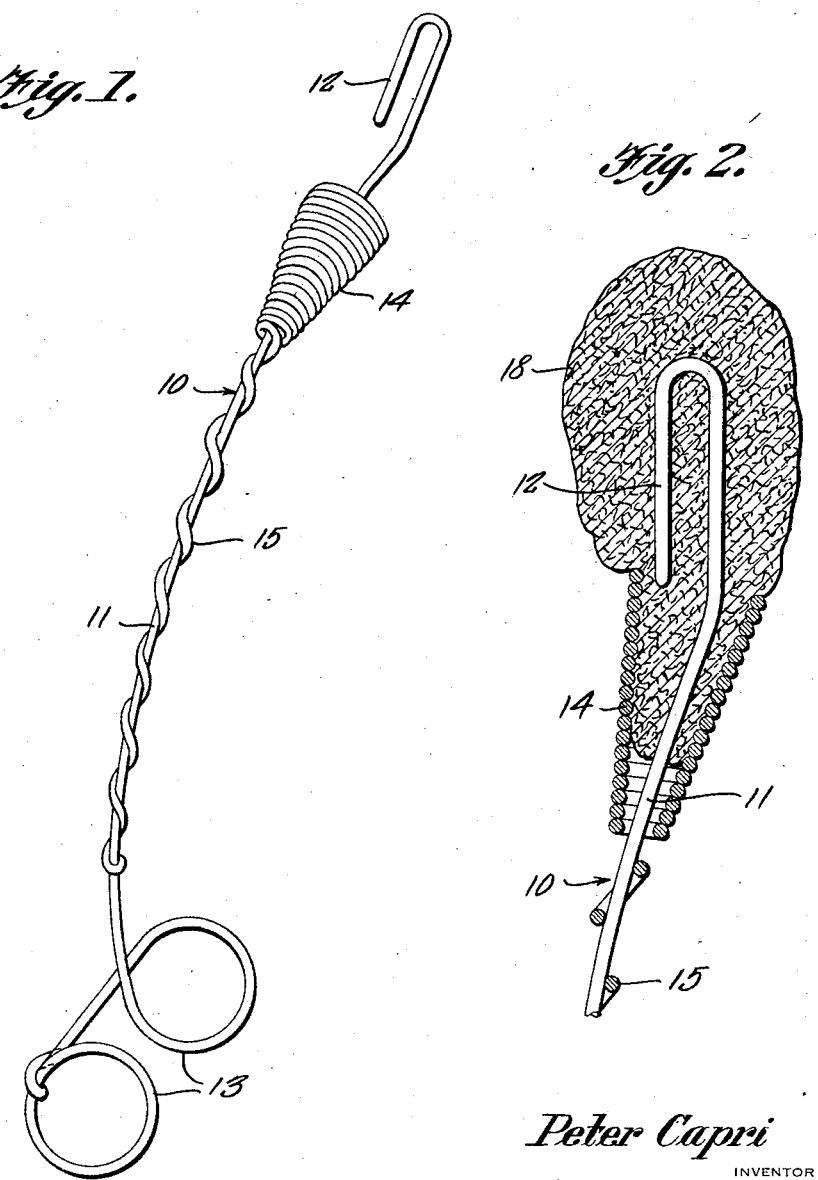
Peter Capri
INVENTOR
BY Victor J. Evans
ATTORNEY Patented May 17, 1927.

1,629,436

UNITED STATES PATENT OFFICE.

PETER CAPRI, OF NEW YORK, N. Y.

SWAB OR DAUBER.

Application filed September 24, 1926. Serial No. 137,539.

This invention relates to improvements in a swab or dauber for clinical purposes and is especially adapted for use in applying a disinfectant or medicant to cavities or parts of the human body such as the throat, nose ears and the like.

The primary object of the invention resides in an instrument for the above purpose which is capable of removably supporting a wad of absorbent cotton or the like onto which the medicant to be used is applied, whereby a clean wad of cotton may be used for each patient or disinfection thereby providing a sanitary instrument.

Another object of the invention is to provide a holder for a wad of absorbent cotton which includes a flexible stem having a hook on one end thereof for the attachment of a wad of cotton to be held thereby, and a handle or finger grip on the other end, there being a clamping jaw slidably mounted on the stem for engagement with the wad of cotton for holding the same in a clamped position about the hook.

With these and other objects in view, the invention resides in certain novel construction and combination and arrangement of parts, the essential features of which are hereinafter fully described, are particularly pointed out in the appended claim, and are illustrated in the accompany drawing, in which:—

Figure 1 is a perspective view of my improved clinical instrument.

Figure 2 is a vertical sectional view therethrough.

Referring more particularly to the drawing, the reference numeral 10 designates my improved instrument in its entirety, and which includes a single piece of relatively stiff resilient wire forming a straight stem or bent to form a curved stem or shank 11 having a hook 12 at one end thereof and a finger grip or handle 13 at its other end. The finger grip 13 is formed by bending the wire into a pair of eyes through which the forefinger and the next adjacent finger of a human hand is inserted when using the instrument.

Slidably mounted on the stem 11 is a cone shaped jaw 14 open at its wide end to slide over the hook 12 for a purpose to be presently explained. The jaw 14 is formed of a single piece of resilient wire which is helically wound while the free end of the wire is twisted about the stem as at 15 to extend upward to a point within reach of the thumb of an operator, whereby the instrument may be held in one hand of an operator and the jaw pushed upward toward the hook 12 with the same hand.

In practice, a wad of absorbent cotton or other similar dauber 18 is placed over the hook 12 and the loose ends of the cotton brought down and bunched about the shank adjacent the hook. The jaw 14 is then pushed upward to cause the same to wedgingly engage the ends of the cotton wad whereby the same are firmly held together. Any tendency of the cotton wad to work loose from the end of the stem is prevented by reason of the hook, as said hook will penetrate the cotton. After or before the cotton has been applied to the holder, the same is dipped or saturated in the medicine to be applied to the part of the body to be treated. To release the cotton wad from the holder after use, it is only necessary to retract the jaw 14 by sliding the same on the stem, after which the wad may be removed and the instrument sterilized so as to keep the same in a highly sanitary condition.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A device of the class described comprising a stem formed of a single piece of relatively stiff flexible wire having one of its ends bent to provide a hook, the other end of said wire provided with a handle, and a cone-shaped clamping jaw slidable on said stem for clamping the free edges of a wad of absorbent cotton about said stem for holding said wad of absorbent cotton over said hook, said clamping jaw formed of a single piece of wire helically wound to form said cone-shaped jaw, said wire being wound spirally about said stem substantially as and for the purpose specified.

In testimony whereof I have affixed my signature.

PETER CAPRI.